United States Patent
Lu et al.

(10) Patent No.: US 11,381,975 B2
(45) Date of Patent: Jul. 5, 2022

(54) METHOD AND DEVICE FOR ANTI-TRACKING OF BLUETOOTH

(71) Applicant: Feitian Technologies Co., Ltd., Beijing (CN)

(72) Inventors: Zhou Lu, Beijing (CN); Huazhang Yu, Beijing (CN)

(73) Assignee: Feitian Technologies Co., Ltd., Beijing (CN)

( * ) Notice: Subject to any disclaimer, the term of this patent is extended or adjusted under 35 U.S.C. 154(b) by 198 days.

(21) Appl. No.: 16/609,486

(22) PCT Filed: Jun. 1, 2018

(86) PCT No.: PCT/CN2018/089517
§ 371 (c)(1),
(2) Date: Oct. 30, 2019

(87) PCT Pub. No.: WO2019/007172
PCT Pub. Date: Jan. 10, 2019

(65) Prior Publication Data
US 2020/0145814 A1     May 7, 2020

(30) Foreign Application Priority Data
Jul. 3, 2017   (CN) .......................... 201710532595.9

(51) Int. Cl.
*G06F 21/00*     (2013.01)
*H04W 12/50*    (2021.01)
(Continued)

(52) U.S. Cl.
CPC ........... *H04W 12/50* (2021.01); *H04L 9/0869* (2013.01); *H04L 63/0869* (2013.01);
(Continued)

(58) Field of Classification Search
CPC ... H04W 12/50; H04W 12/041; H04W 12/06; H04W 4/80; H04W 12/069; H04W 12/02;
(Continued)

(56) References Cited

U.S. PATENT DOCUMENTS

| 2013/0259230 A1* | 10/2013 | Polo ...................... H04W 12/50 380/270 |
| 2015/0222517 A1* | 8/2015 | McLaughlin ....... H04L 63/0435 713/156 |

(Continued)

FOREIGN PATENT DOCUMENTS

CN           105430605 A   *   3/2016   ............ H04W 12/02

OTHER PUBLICATIONS

Martin Woolley, "Bluetooth Technology Protecting Your Privacy", Apr. 2, 2015, https://www.bluetooth.com/blog/bluetooth-technology-protecting-your-privacy/ (Year: 2015).*

*Primary Examiner* — Trong H Nguyen
*Assistant Examiner* — Michael M Lee
(74) *Attorney, Agent, or Firm* — Hammer & Associates, P.C.

(57) ABSTRACT

A method for avoiding a Bluetooth device from being traced, which comprises the following steps: parsing, by a target Bluetooth device, a second dynamic address to obtain a second random number and a second data; and generating, by the target Bluetooth device, a plurality of the third data successively according to the identity parsed keys in the identity parsed keys list save by the target Bluetooth device and a second random number, and determining whether there exists any third data which is the same as the second data, if yes, determining that there exists the second identity parsed key which is authenticated successfully; otherwise, determining that there isn't the second identity parsed key which is authenticated successfully.

9 Claims, 5 Drawing Sheets

(51) Int. Cl.
  *H04L 9/08* (2006.01)
  *H04L 9/40* (2022.01)
  *H04W 12/06* (2021.01)
  *H04W 12/041* (2021.01)
  *H04W 4/80* (2018.01)
  *G06Q 50/26* (2012.01)

(52) U.S. Cl.
  CPC ....... *H04L 63/0876* (2013.01); *H04W 12/041* (2021.01); *H04W 12/06* (2013.01); *G06Q 50/265* (2013.01); *H04W 4/80* (2018.02)

(58) Field of Classification Search
  CPC ............... H04L 9/0869; H04L 63/0869; H04L 63/0876; H04L 63/0407; H04L 61/2092; H04L 2209/805; G06Q 50/265; H04B 5/0025
  See application file for complete search history.

(56) References Cited

U.S. PATENT DOCUMENTS

| | | | |
|---|---|---|---|
| 2016/0099936 A1* | 4/2016 | Enke | H04W 4/80 726/7 |
| 2017/0201886 A1* | 7/2017 | Yang | H04W 12/35 |
| 2017/0280495 A1* | 9/2017 | Zhang | H04W 76/10 |
| 2018/0198752 A1* | 7/2018 | Zhang | H04W 12/02 |

* cited by examiner

METHOD AND DEVICE FOR ANTI-TRACKING OF BLUETOOTH

FIELD OF THE INVENTION

The present disclosure relates to a method for preventing a Bluetooth device from being traced and a device thereof.

PRIOR ART

In prior art, a Bluetooth device is a radio frequency product, which needs to broadcast some identity information, such as MAC (Medium Access Control) address, a device name, to be identified by a device which communicates with the Bluetooth device; however, hackers can trace the Bluetooth device via these information and a distance of the frequency information in the process, in this way, the hackers can steal private data of the Bluetooth device and of a user of the Bluetooth device, thus, the process is not safe for the user.

SUMMARY OF THE INVENTION

The object of the present invention is to provide a method for preventing a Bluetooth device from being traced and a device thereof, in which the Bluetooth device changes a dynamic address of itself periodically to prevent hackers from stealing data.

Thus, according to one aspect of the present invention, there is provided a method for preventing the Bluetooth device from being traced, the method includes:

Step S1, a target Bluetooth device powers on, generates a first random number every a first preset duration, generates a first data according to the first random number and a first identity parsed key of itself, generates a first dynamic address according to the first random number and the first data, broadcasts broadcasting data including the first dynamic address, and executes Step S2 when a connecting request is received from a mobile device;

Step S2, the target Bluetooth device connects to the mobile device, parses the connecting request to obtain a second dynamic address of the mobile device, and returns a connecting response to the mobile device;

Step S3, the target Bluetooth device waits for receiving data sent from the mobile device, goes to Step S4 in the case that the data is a matching request; goes to Step S5 in the case that the data is a link encrypted request;

Step S4, the target Bluetooth device matches with the mobile device, saves a second identity parsed key included in the matching request into an identity parsed keys list, generates a matching response including a first identity parsed key of itself, and returns the matching response to the mobile device, and returns to Step S3;

Step S5, the target Bluetooth device authenticates the second dynamic address by successively using the identity parsed keys in the identity parsed keys list saved in the target Bluetooth device, determines whether there exists the second identity parsed key which is authenticated successfully, if yes, goes to Step S6; otherwise, returns an error code to the mobile device connecting to the target Bluetooth device, disconnects the connection, the method comes to an end; and Step S6, the target Bluetooth device saves dialogue key information according to a link encrypted request, returns a success response to the mobile device connecting to the target Bluetooth device and communicates with the mobile device, the method comes to an end.

Preferably, the said generating the first random number, and generating the first data according to the first random number and the first identity parsed key of itself, and generating the first dynamic address according to the first random number and the first data in Step S1, specifically comprises:

Step a1, generating, by the target Bluetooth device, the first random number, and adding bits to the first random number;

Step a2, encrypting, by the target Bluetooth device, the first random number after it is added bits by using the first identity parsed key of itself to obtain a first random number ciphertext;

Step a3, executing, by the target Bluetooth device a preset operation on the first random number ciphertext to obtain the first data; and Step a4, joining orderly, by the target Bluetooth device, the first random number with the first data to obtain the first dynamic address.

Preferably, before parsing the connecting request to obtain the second dynamic address of the mobile device, Step S2 further comprises:

Step B1, determining, by the target Bluetooth device, whether an address included in the connecting request is a dynamic address, if yes, making the address as the second dynamic address, and continuing to parse the connecting request to obtain the second dynamic address of the mobile device; otherwise, returning a connecting response to the mobile device, and going to Step B2;

Step B2, waiting, by the target Bluetooth device, for receiving data sent from the mobile device, going to Step B3 in the case that the data is the link encrypted request; matching with the mobile device in the case that the data is the matching request, and saving the matching information, and generating the matching response which includes the first identity parsed key of itself, and returning the matching response to the mobile device, and going to Step B2; and Step B3, determining, by the target Bluetooth device, whether the matching information saved by itself includes the matching information of the mobile device, if yes, saving dialogue key information according to the link encrypted request, returning the success response to the mobile device and communicating with the mobile device, the method coming to an end; otherwise, returning the error code to the mobile device, disconnecting the connection, and the method coming to an end.

Preferably, in Step B1, the target Bluetooth device determining whether the address included in the connecting request is the dynamic address specifically comprises: determining, by the target Bluetooth device, whether data on a second preset bit of the address included in the connecting request is preset data, if yes, the address included in the connecting request is the dynamic address; otherwise, the address included in the connecting request is not the dynamic address.

Preferably, in Step B3, the target Bluetooth device determining whether the matching information saved by itself includes the matching information of the mobile device specifically comprises that the target Bluetooth device determining whether the matching information saved by itself includes the address included in the received connecting request, if yes, the matching information saved by itself includes the matching information of the mobile device; otherwise, the matching information saved by itself does not include the matching information of the mobile device.

Preferably, Step S3 further comprises that the target Bluetooth device determining whether data sent from the mobile device is received in a second preset duration, if yes, going to Step S4 in the case that the data is the matching request; going to Step S5 in the case that the data is the link encrypted request; otherwise, powering off, the method coming to an end.

Preferably, before saving the second identity parsed key included in the matching information into the identity parsed keys list, Step S4 further comprises that Step H, determining, by the target Bluetooth device, whether the identity parsed keys list saved by itself includes the second identity parsed key included in the matching request, if yes, generating a matching response including the first identity parsed key included by itself, returning the matching response to the mobile device, and returning Step S3; otherwise, continuing to save the second identity parsed key included in the matching request into the identity parsed keys list; or Step F, determining, by the target Bluetooth device, whether the identity parsed keys list saved by itself comprises the second identity parsed key included in the matching request, if yes, removing the second identity parsed key included in the identity parsed keys list, continuing to save the second identity parsed key included in the matching request into the identity parsed keys list; otherwise, continuing to save the second identity parsed key included in the matching request into the identity parsed keys list.

Preferably, before Step S5, the method further comprises that determining, by the target Bluetooth device, whether the identity parsed keys list saved by itself is empty, if yes, returning the error code to the mobile device connected to the target Bluetooth device, disconnecting the connection, the method coming to an end; otherwise, going to Step S5.

Preferably, in Step S5, the target Bluetooth device authenticating the second dynamic address by orderly using the identity parsed key in the identity parsed keys list saved by itself, and determining whether there exists the second identity parsed key which is authenticated successfully specifically comprises that Step b1, parsing, by the target Bluetooth device, the second dynamic address to obtain the second random number and the second data; and Step b2, generating, by the target Bluetooth device, multiple of third data according orderly to the identity parsed keys in the identity parsed keys list saved by itself and the second random number, and determining whether there exists a third data which is the same as the second data, if yes, there exists the second identity parsed key which is authenticated successfully; otherwise, there exists no second identity key which is authenticated successfully.

Preferably, Step b1 specifically comprises that the target Bluetooth device reading a high preset bit of the second dynamic address to obtain a second random number, reading a low preset bit of the second dynamic address to obtain the second data.

Preferably, in Step b2, the targeting Bluetooth device generating multiple of a third data according orderly to the identity parsed keys in the identity parsed keys list saved by itself and the second random number specifically comprises that Step d1, adding, by the target Bluetooth device, bits to the second random number; and Step d2, encrypting, by the target Bluetooth device, the second data after it is added with the bits by using orderly the identity parsed keys in the identity parsed keys list saved by itself to obtain multiple of the second random number ciphertext, and executing preset operation on multiple of the second random number ciphertext to obtain multiple of the third data.

Preferably, Step S6 specifically comprises that

Step t1, parsing, by the target Bluetooth device, the link encrypted request to obtain a dialogue key identification, determining whether the dialogue keys list saved by itself includes the dialogue key identification, if yes, returning the success response to the mobile device connecting to the Bluetooth device and communicating with the mobile device, ending; otherwise, going to Step t2; and Step t2, negotiating, by the target Bluetooth device, with the mobile device to obtain a dialogue key, and saving the dialogue key correspondingly with the dialogue key identification into the dialogue keys list, and returning the success response to the mobile device connecting to the target Bluetooth device and communicating with the mobile device, ending.

Preferably, the method further comprises that

Step W1, sending, by the mobile device, a connecting request including the second dynamic address of itself to the target Bluetooth device when the mobile device scans and get the target Bluetooth device;

Step W2, parsing, by the mobile device, obtained broadcasting data of the target Bluetooth device to obtain the first dynamic address when the mobile device receives the connecting response returned from the target Bluetooth device;

Step W3, determining, by the mobile device, whether there exists an identity parsed key of the Bluetooth device saved by the mobile device, if yes, going to Step W5; otherwise, going to Step W4;

Step W4, generating, by the mobile device, the matching request including the second identity parsed key of the mobile device, sending the matching request to the target Bluetooth device, receiving the matching response returned from the target Bluetooth device, and saving the first identity parsed key included in the matching response, and going to Step W6;

Step W5, authenticating, by the mobile device, the first dynamic address by orderly using the identity parsed key of the Bluetooth device saved by the mobile device, and determining whether there exists a first identity parsed key which is authenticated successfully, if yes, going to Step W6; otherwise, returning to Step W4; and Step W6, sending, by the mobile device, the link encrypted request to the target Bluetooth device, receiving a response returned from the target Bluetooth device, communicating with the mobile device in the case that the response is a success response, ending; disconnecting the connection in the case that the response is the error code, ending.

Preferably, when the response returned from the target Bluetooth device which is received by the mobile device is the error code, Step W6 further comprises prompting, by the mobile device, the information is incorrect to a user via an application program, and receiving widget triggering information from the user, returning to Step W4 in the case that the widget triggering information is rematch information; disconnecting the connection and ending in the case that the widget triggering information is ending information; and after returning the error code to the mobile device connected Step S5 further comprises that returning to Step S4 in the case that the matching request is received from the mobile device connected in the second preset duration.

According to another respect of the present invention, it provides a device for avoiding a Bluetooth from being traced, which comprises a powering on module which is configured to power on the device;

a first generating module which is configured to generate a first random number every a first preset duration;

a second generating module which is configured to generate a first data according to the first random number generated by the first generating module and the a first identity parsed key of the device;

a third generating module which is configured to generate a first dynamic address according to the first random number generated by the first generating module and the first data generated by the second generating module;

a broadcasting module which is configured to broadcast broadcasting data including the first dynamic address;

a first receiving module which is configured to receive data from a mobile device;

a connecting module which is configured to connect the mobile device in the case that the first receiving module receives a connecting request;

a parsing module which is configured to parse the connecting request received by the first receiving module to obtain a second dynamic address of the mobile device;

a first sending module which is configured to return a connecting response to the mobile device;

the first receiving module is further configured to wait for receiving data sent from the mobile device after the first sending module returns the connecting response to the mobile device;

a matching module which is configured to match with the mobile device in the case that the first receiving module receives a matching request sent from the mobile device;

a first saving module which is configured to save a second identity parsed key included in the matching request received by the first receiving module into an identity parsed keys list;

a fourth generating module which is configured to generate a matching response which comprises the first identity parsed key of the device;

the first sending module is further configured to return the matching response generated by the fourth generating module to the mobile device;

the first receiving module is further configured to wait for receiving data sent from the mobile device after the first sending module returns the matching response to the mobile device;

an authenticating module which is configured to use every identity parsed key in the identity parsed keys list which is saved in the authenticating module to authenticate the second dynamic address obtained by the parsing module successively when the first receiving module receives a link encrypted request sent from the mobile device;

a first determining module which is configured to determine whether there exists the second identity parsed key which is authenticated successfully;

the first sending module is further configured to return an error code to the connected mobile device when the first determining module determines that there exists no the second identity parsed key which is authenticated successfully;

a disconnecting module which is configured to disconnect the connection after the first sending module returns the error code to the connected mobile device;

a second saving module which is configured to save dialogue key information according to the link encrypted request received by the first receiving module when the first determining module determines there exists the second identity parsed key which is authenticated successfully;

the first sending module is further configured to return a success response to the connected mobile device after the second saving module saves the dialogue key information; and a communicating module which is configured to communicate with the connected mobile device after the first sending module returns the success response to the connected mobile device.

Preferably, the first generating module is specifically configured to generate a first random number, and add bits to the first random number;

the second generating module is specifically configured to use the first identity parsed key of the device to encrypt the first random number which is added with bits to obtain a first random number ciphertext, and operate a preset operation on the first random number ciphertext to obtain the first data; and the third generating module is specifically configured to orderly join the first random number generated by the first generating module with the first data generated by the second generating module to obtain the first dynamic address.

Preferably, the device further includes a second determining module, an as module, a second sending module, a second receiving module, a matching and saving module, a third determining module and a third saving module;

the second determining module is configured to determine whether an address included in the connecting request is a dynamic address;

the as module is configured to be as the second dynamic address of the mobile device and to trigger the parsing module when the second determining module determines that the address included in connecting request is the dynamic address;

the second sending module is configured to return a connecting response to the mobile device when the second determining module determines that the address included in the connecting request is not the dynamic address;

the second receiving module is configured to wait for receiving data sent from the mobile device after the second sending module returns the connecting response to the mobile device;

the matching and saving module is configured to match with the mobile device and save matching information when the second receiving module receives the matching request;

the second sending module is configured to generate a matching response including the first identity parsed key of the device and return the matching response to the mobile device after the matching and saving module saves the matching information;

the second receiving module is further configured to wait for receiving data from the mobile device after the second sending module returns the matching response to the mobile device;

the third determining module is configured to determine whether the matching information saved includes the matching information of the mobile device when the second receiving module receives the link encrypted request;

the third saving module is further configured to save the dialogue key information according to the link encrypted request when the third determining module determines that the saved matching information includes the matching information of the mobile device;

the second sending module is further configured to return the success response to the mobile device after the third saving module saves the dialogue key information;

the communicating module is further configured to communicate with the mobile device after the second sending module returns the success response to the mobile device;

the second sending module is further configured to return the error code to the mobile device when the third determining module determines that the saved matching information does not include the matching information of the mobile device; and the disconnecting module is further configured to disconnect the connection after the second sending module returns the error code to the mobile device.

Preferably, the second determining module is specifically configured to determine whether data on a second preset bit of the address included in the connecting request is preset data, if yes, the address included in the connecting request is the dynamic address; otherwise, the address included in the connecting request is not the dynamic address.

Preferably, the third determining module is specifically configured to determine whether the matching information saved in the device includes the address which is included in the received connecting request, if yes, determines the matching information saved in the device includes the matching information of the mobile device; otherwise, determines the matching information saved in the device does not include the matching information of the mobile device.

Preferably, the device further includes a fourth determining module and a turning off module;

the fourth determining module is configured to determine whether the first receiving module receives data sent from the mobile device in a second preset duration; and the turning off module is configured to turn off the device when the fourth determining module determines that the first receiving module does not receive the data sent from the mobile device in the second preset duration.

Preferably, the device further includes a fifth determining module, or a sixth determining module and a deleting module;

the fifth determining module is configured to determine whether the identity parsed keys list saved by the device includes the second identity parsed key included in the matching request;

the fourth generating module is further configured to generate the matching response including the first identity parsed key of the device when the fifth determining module determines that the identity parsed keys list saved by the device includes the second identity parsed key included in the matching request;

the first saving module is specifically configured to save the second identity parsed key included in the matching request into the identity parsed keys list when the fifth determining module determines that the identity parsed keys list saved by the device does not include the second identity parsed key included in matching request;

the sixth determining module is configured to determine the identity parsed keys list saved by the device includes the second identity parsed key included in the matching request;

the deleting module is configured to delete the second identity parsed key included in the identity parsed keys list when the sixth determining module determines that the identity parsed keys list saved by the device includes the second identity parsed key included in the matching request; and the first saving module is further configured to save the second identity parsed key included in the matching request into the identity parsed keys list after the deleting module deletes the second identity parsed key included in the identity parsed keys list; is further configured to save the second identity parsed key included in the matching request into the identity parsed keys list when the sixth determining module determines that the identity parsed keys list saved by the device does not includes the second identity parsed key included in the matching request.

Preferably, the device further includes a seventh determining module;

the seventh determining module is configured to determine whether the identity parsed keys list saved by the device is null;

the first sending module is further configured to return the error code to the connected mobile device when the seventh determining module determines that the identity parsed keys list saved by the device is null; and the authenticating module is specifically configured to successively use the identity parsed keys in the identity parsed keys list saved by the device to authenticate the second dynamic address obtained by the parsing module when the seventh determining module determines that the identity parsed keys list saved by the device is not null.

Preferably, the authenticating module includes a first parsing sub module and a generating sub module;

the first parsing sub module is configured to parse the second dynamic address to obtain a second random number and a second data;

the generating sub module is configured to generate multiple of third data successively according to the identity parsed keys in the identity parsed keys list saved by the device and the second random number; and the first determining module is specifically configured to determine a third data which is the same as the second data obtained by the first parsing sub module, if yes, there exists the second identity parsed key which is authenticated successfully; otherwise, there exists no second identity parsed key which is authenticated successfully.

Preferably, the first parsing sub module is specifically configured to read a high preset bit of the second dynamic address to obtain the second random number, and to read a low preset bit of the second dynamic address to obtain the second data.

Preferably, the generating sub module includes an adding bit unit, an encrypting unit and an operating unit;

the adding number unit is configured to add bits to the second random number obtained by the parsing sub module;

the encrypting unit is configured to encrypt the second random number, which is added bits, obtained by the adding number unit by successively using the identity parsed keys in the identity parsed keys list saved by the device to obtain multiple of the second random number ciphertext; and the operating unit is configured to execute a preset operation on multiple of the second random number ciphertexts obtained by the encrypting unit to obtain multiple of the third data.

Preferably, the second saving module includes a second parsing sub module, a determining sub module, a consulting sub module and a saving sub module;

the second parsing sub module is configured to parse the link encrypted request received by the first receiving module to obtain a dialogue key identification;

the determining sub module is configured to determine whether a dialogue key list saved by the device includes the dialogue key identification;

the first sending module is further configured to return the success response to the connected mobile device when the determining sub module determines that the dialogue key list saved by the device includes the dialogue key identification;

the consulting sub module is configured to consult a dialogue key with the mobile device when the determining sub module determines the dialogue key list saved by the device does not include the dialogue key identification;

the saving sub module is configured to save the dialogue key obtained by the consulting sub module corresponding to the dialogue key identification obtained by the second parsing sub module into the dialogue key list; and the first sending module is further configured to return the success response to the connected mobile device after the saving sub module saves the dialogue key obtained by the consulting sub module corresponding to the dialogue key identification obtained by the second parsing sub module into the dialogue key list.

Preferably, the matching module is further configured to match with the connected mobile device after the first sending module returns the error code to the connected mobile and when the first receiving module receives a matching request sent from the connected mobile device in the second preset duration.

According to the present invention, the Bluetooth device changes the dynamic address of itself periodically, and the Bluetooth device just can parse a dynamic address of a credible device which has matched with the Bluetooth device and exchanged the identity parsed key with the Bluetooth device, and can communicate with the device, in this way, data can be avoided from being stolen by a hacker effectively, and ensure the safety of the Bluetooth device and data used by the Bluetooth device user; meanwhile, the Bluetooth device does not need to match with the credible device in the case that the process of matching with the credible device has finished, thus the time for building communication can be shorter, and it's more convenient for a user.

BRIEF DESCRIPTION OF ACCORDING DRAWINGS

DETAILED DESCRIPTION OF EMBODIMENTS

The technical solution in the Embodiment of the present invention is further described more clearly and completely with the drawings of the present invention. Apparently, Embodiment described herein are just a few Embodiment of the present invention. On the basis of Embodiment of the invention, all other related Embodiment made by those skilled in the art without any inventive work belong to the scope of the invention.

In the present invention, a Bluetooth device changes a dynamic address of itself periodically and broadcasts the dynamic address of itself; the Bluetooth device will not change the dynamic address of itself during the process that the Bluetooth device communicates with a mobile device after the Bluetooth device and the mobile device authenticate each other successfully.

The said identity parsed key in the present invention is Identity Resolving Key, i.e. IRK for short.

Embodiment 1

Figure 1:
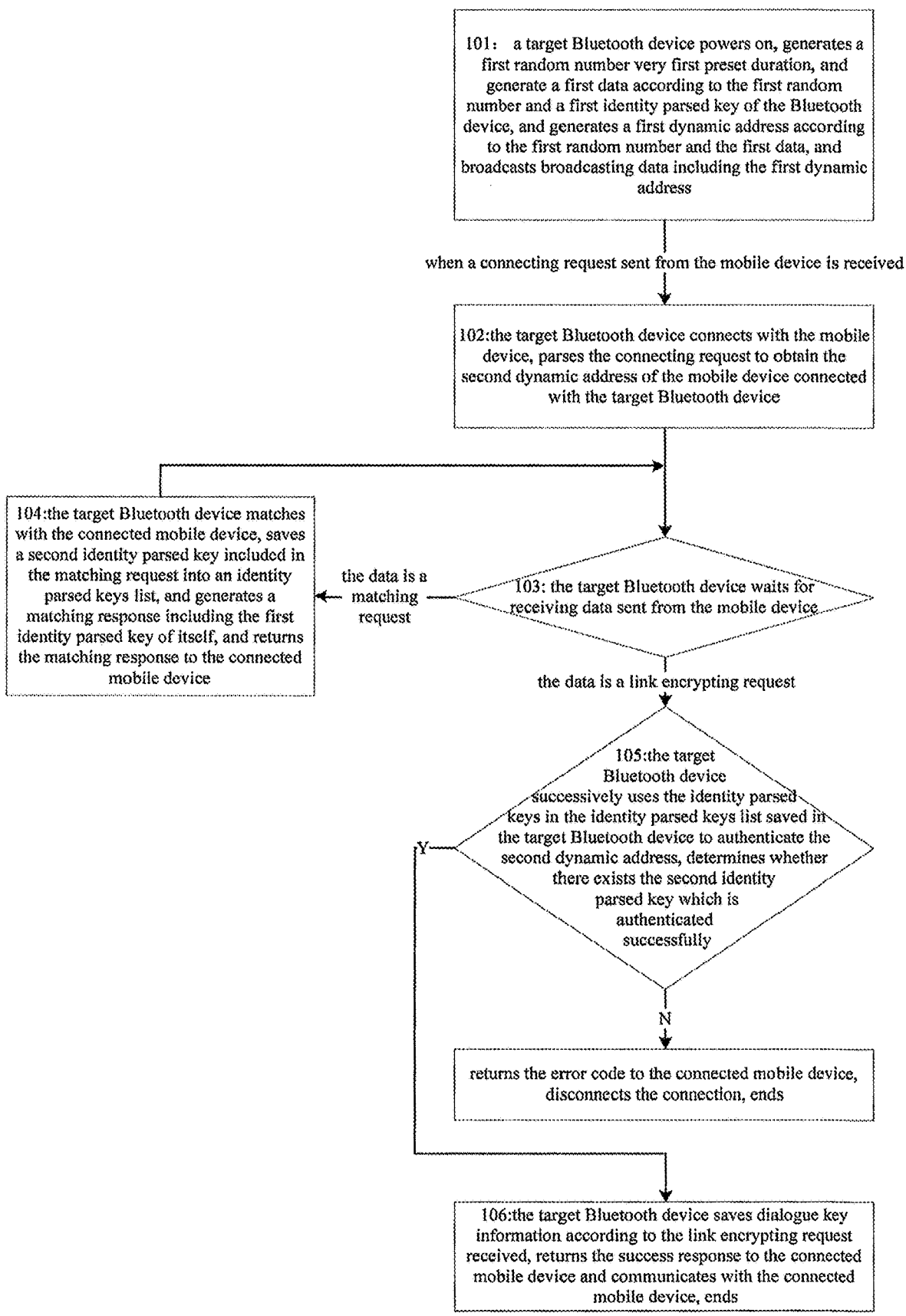
FIG. 1 shows a flow diagram of a method for avoiding a Bluetooth from being tracing according to Embodiment 1 of the present invention.

It provides a method for avoiding a Bluetooth from being tracing according to Embodiment 1 of the present invention, as shown in FIG. 1, comprises Step 101, a target Bluetooth device powers on, generates a first random number every first preset duration, and generates a first data according to the first random number and a first identity parsed key of the Bluetooth device, and generates a first dynamic address according to the first random number and the first data, and broadcasts broadcasting data including the first dynamic address, and executes Step 102 when a connecting request sent from the mobile device is received;

Step 102, the target Bluetooth device connects with the mobile device, parses the connecting request to obtain the second dynamic address of the mobile device connected with the target Bluetooth device, returns a connecting response to the connected mobile device;

Step 103, the target Bluetooth device waits for receiving data send from the mobile device, goes to Step 104 in the case that the data is a matching request; goes to Step 105 in the case that the data is a link encrypted request;

Step 104, the target Bluetooth device matches with the connected mobile device, saves a second identity parsed key included in the matching request into an identity parsed keys list, and generates a matching response including the first identity parsed key of itself, and returns the matching response to the connected mobile device, and returns to Step 103;

Step 105, the target Bluetooth device successively uses the identity parsed key in the identity parsed keys list saved in the target Bluetooth device to authenticate the second dynamic address, determines whether there exists the second identity parsed key which is authenticated successfully, if yes, goes to Step 106; otherwise, returns the error code to the connected mobile device, disconnects the connection, ends;

Step 106, the target Bluetooth device saves dialogue key information according to the link encrypted request received, returns the success response to the connected mobile device and communicates with the connected mobile device, ends.

In Embodiment 1, before Step 105, the method further includes the target Bluetooth device determines whether the identity parsed keys list saved by the target Bluetooth device is null, if yes, returns the error code to the connected mobile device, disconnects the connection, the method comes to an end; otherwise, goes to Step 105.

Furthermore, the method in Embodiment 1 further includes

Step W1, the mobile device sends a connecting request including the second dynamic address of the mobile device to the target Bluetooth device when the mobile device scans to get the target Bluetooth device;

Step W2, the mobile device parses the obtained broadcast data of the target Bluetooth device to obtain the first dynamic address when the connecting response returned from the target Bluetooth device is received by the mobile device;

Step W3, the mobile device determines whether the mobile device saves the identity parsed key of the Bluetooth device, if yes, goes to Step W5; otherwise, goes to Step W4;

Step W4, the mobile device generates the matching request including the second identity parsed key of the mobile device, sends the matching request to the target Bluetooth device, receives the matching response returned from the target Bluetooth device, and saves the first identity parsed key included in the matching response, and goes to Step W6;

Step W5, the mobile device successively uses the identity parsed keys of the Bluetooth device saved by the mobile device to authenticate the first dynamic address, determines whether there exists the first identity parsed key which is authenticated successfully, if yes, goes to Step W6; otherwise, returns to Step W4;

Step W6, the mobile device sends the link encrypted request to the target Bluetooth device, receives a response returned from the target Bluetooth device, communicates with the target Bluetooth device in the case that the response is the success response, the method comes to an end; disconnects the connection in the case that the response is the error code, and the method comes to an end.

In Embodiment 1, in the case that response returned from the target Bluetooth device is the error code which is received by the mobile device, Step W6 further includes the mobile device prompts that user information is incorrect via an applet, and receives widget triggering information from the user, returns to Step W4 in the case that the widget triggering information is information of re-matching; disconnects the connection and the method comes to an end in the case that the widget triggering information is ending information;

Correspondingly, after the error code is returned to the connected mobile device, Step 105 further includes returning to Step 104 when the matching request sent from the connected mobile device is received in the second preset duration.

Embodiment 2

Figure 2:
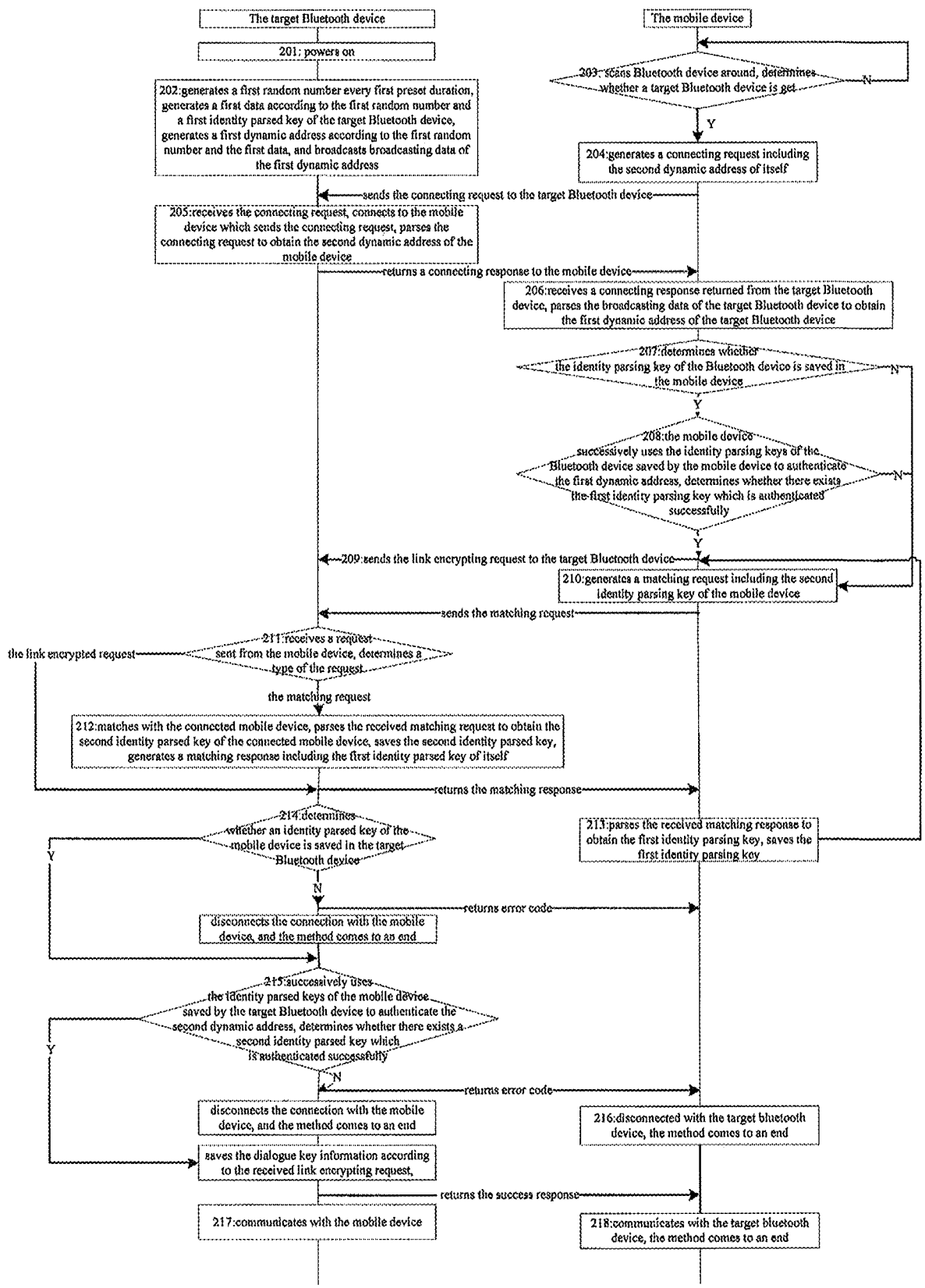
FIG. 2 shows a flow diagram of a method for avoiding a Bluetooth from being tracing according to Embodiment 2 of the present invention.

It provides a method for avoiding a Bluetooth device from being traced according to Embodiment 2 of the present invention, as shown in FIG. 2, including:

Step 201, a target Bluetooth device powers on;

Step 202, the target Bluetooth device generates a first random number every first preset duration, generates a first data according to the first random number and a first identity parsed key of the target Bluetooth device, generates a first dynamic address according to the first random number and the first data, and broadcasts broadcasting data including the first dynamic address;

Preferably, in Embodiment 2, the first preset duration is 60 seconds;

In Embodiment 2, that the targets Bluetooth device generates the first random number, generates the first data according to the first random number and the first identity parsed key of itself, and generates the first dynamic address according to the first random number and the first data specifically includes Step a0, the target Bluetooth device generates the first random number, adds bits to the first random number; specifically, the target Bluetooth device generates the first random number of 24 bits, and the two highest bits of the random number is 01, adds 0 of the first preset bit to the left of the first random number; preferably, in Embodiment 2, the first preset bit is 104 bits; for instance, in Embodiment 2, the first random number generated by the target Bluetooth device is 423456, the first random number which is added bits by the target Bluetooth device is 0000000000000000000000000000423456.

Step a2, the target Bluetooth device uses the first identity parsed key of itself to encrypt the first random number which is added bits by the target Bluetooth device; specifically, the target Bluetooth device uses the first identity parsed key to execute AES encryption on the first random number which is added bits to obtain the first random number ciphertext;

for instance, in Embodiment 2, the first identity parsed key of the target Bluetooth device is 0102030405060708090A0B0C0D0E0F10, the obtained first random number ciphertext is 9912D4DD9EE195461905995511D766B05.

Step a3, the target Bluetooth device executes the preset operation on the first random number ciphertext to obtain the first data; specifically, the target Bluetooth device uses the first random number ciphertext to execute modulo operation on $2^{24}$ to obtain an operation result, and makes the operation result as the first data;

for instance, in Embodiment 2, the target Bluetooth device uses the first random number ciphertext to execute modulo operation on $2^{24}$ to obtain the operation result which is 766B05, that means the first data is 766B05.

Step a4, the target Bluetooth device joins the first random number with the first data orderly to obtain the first dynamic address; for instance, in Embodiment 2, the first dynamic address obtained by the target Bluetooth device by joining the first random number with the first data orderly is 423456766B05.

Step 203, the mobile device scans Bluetooth devices around, determines whether a target Bluetooth device is scanned, if yes, goes to Step 204; otherwise, continues Step 203;

specifically, a first device scans Bluetooth devices around, obtains broadcasting data of the Bluetooth device scanned, parses the obtained broadcasting data to obtain a device name of the Bluetooth device, determines whether the device name of the Bluetooth device is the same as a device name of the target Bluetooth device, if yes, determines that the target Bluetooth device is scanned; otherwise, determines that the target Bluetooth device is not scanned.

Furthermore, in Embodiment 2, before Step 203, the method further includes the mobile device generates the second dynamic address of itself;

In Embodiment 2, the process of generating the second dynamic address of itself by the mobile device is the same as the process of generating the first dynamic address by the target Bluetooth device, more details will be not given herein. For instance, the second dynamic address of itself generated by the mobile device is 683D9752CB5E.

It needs to be noted that Step 202 and Step 203 in Embodiment 2 can be executed at the same time, regardless of the order.

Step 204, the mobile device generates a connecting request including the second dynamic address of itself, sends the connecting request to the target Bluetooth device;

Step 205, the target Bluetooth device receives the connecting request, connects to the mobile device which sends the connecting request, parses the connecting request to obtain the second dynamic address of the mobile device, returns a connecting response to the mobile device;

In Embodiment 2, before the target Bluetooth device parses the connecting request to obtain the second dynamic address of the mobile device, the method further includes Step B1, the target Bluetooth device determines whether an address included in the connecting request is a dynamic address, if yes, makes the address as the second dynamic address of the mobile device, continues to parse the received connecting request to obtain the second dynamic address of the mobile device; otherwise, returns the connecting response to the mobile device, and goes to Step B2;

specifically, the target Bluetooth device determines whether data on the second preset bit of the address included in the received connecting request is preset data, if yes, determines that the address included in the received connecting request is the dynamic address; otherwise, determines that the address included in the received connecting request is not the dynamic address;

in Embodiment 2, the second preset bit is the two highest bits, the preset data is 01.

For instance, in Embodiment 2, the device address included in the connecting request is 683D9752CB5E, thus the address is determined to be the dynamic address.

Step B2, the target Bluetooth device waits for receiving data sent from the mobile device, goes to Step B3 in the case that the data is a link encrypted request; matches with the mobile device, saves matching information, and generates a matching response including the first identity parsed key of itself and continues Step B2 in the case that the data is a matching request;

Step B3, the target Bluetooth device determines whether the matching information saved by itself includes the matching information which is with the mobile device, if yes, saves the dialogue key information according to the link encrypted request, returns the success response to the mobile device and communicates with the mobile device, the method comes to an end; otherwise, returns error code to the mobile device, the method comes to an end.

In Embodiment 2, that the target Bluetooth device determines whether the matching information saved by itself includes the matching information which is about the mobile device specifically comprises the target Bluetooth device determines whether the matching information saved by itself includes an address included in the received connecting request, if yes, determines that the matching information saved by itself includes the matching information which is about the mobile device; otherwise, determines that the matching information saved by itself does not include the matching information which is about the mobile device.

Furthermore, in Embodiment 2, saving the dialogue key information according to the link encrypted request, returning the success response to the mobile device and communicating with the mobile device specifically comprises Step t1, the target Bluetooth device parses the link encrypted request to obtain a dialogue key identification, determines whether the dialogue keys list saved by itself includes the dialogue key identification, if yes, returns the success response to the connected mobile device and communicates with the connected mobile device, the method comes to an end; otherwise, goes to Step t2;

Step t2, the target Bluetooth device consults a dialogue key with the mobile device, saves the dialogue key with the dialogue key identification correspondingly into the dialogue keys list, returns the success response to the connected mobile device and communicates with the connected mobile device, the method comes to an end.

Step 206, the mobile device receives a connecting response returned from the target Bluetooth device, parses the broadcasting data of the target Bluetooth device to obtain the first dynamic address of the target Bluetooth device;

In Embodiment 2, before parsing the broadcasting data of the target Bluetooth device to obtain the first dynamic address of the target Bluetooth device, the method further comprises Step D1, the mobile device determines whether the address included in the broadcasting data of the target Bluetooth device is a dynamic address, if yes, makes the address as the first dynamic address of the target Bluetooth device, parses the broadcasting data of the target Bluetooth device to obtain the first dynamic address of the target Bluetooth device; otherwise, goes to Step D2;

specifically, the mobile device determines whether data on the second preset bit of the address included in the broadcasting data of the target Bluetooth device is the preset data, if yes, determines that the address included in the broadcasting data of the target Bluetooth device is the dynamic address; otherwise, determines that the address included in the broadcasting data of the target Bluetooth device is not the dynamic address; in Embodiment 2, the second preset bit is the two highest bits, the preset data is 01.

For instance, in Embodiment 2, the address included in the broadcasting data of the target Bluetooth device is 423456766B05, thus, the address is a dynamic address.

Step D2, the mobile device determines whether the matching information saved by itself includes the matching information which is about the target Bluetooth device, if yes, goes to Step D3; otherwise, goes to Step D4; specifically, the mobile device determines whether the matching information saved by itself includes the address included in the broadcasting data, if yes, determines that the matching information saved by itself includes the matching information which is about the target Bluetooth device; otherwise, determines that the matching information saved by itself does not include the matching information which is about the target Bluetooth device.

Step D3, the mobile device sends the link encrypted request to the target Bluetooth device, communicates with the target Bluetooth device in the case that the success response returned from the target Bluetooth device is received, the method comes to an end; disconnects the connection in the case that the error code is received, the method comes to an end;

Step D4, the mobile device generates a matching request including the second identity parsed key of itself, sends the matching request to the target Bluetooth device, saves the matching information in the case that a matching response returned from the target Bluetooth device is received, and returns to Step D3.

Step 207, the mobile device determines whether the identity parsed key of the Bluetooth device is saved in the mobile device, if yes, goes to Step 208; otherwise, goes to Step 210; specifically, the mobile device determines whether the identity parsed keys list saved by itself is null, if yes, there is no identity parsed key of the Bluetooth device is saved by the mobile device, goes to Step 210; otherwise, there is identity parsed key of the Bluetooth device saved by the mobile device, goes to Step 208.

Step 208, the mobile device successively uses the identity parsed keys of the Bluetooth device saved by the mobile device to authenticate the first dynamic address, determines whether there exists the first identity parsed key which is authenticated successfully, if yes, goes to Step 209; otherwise, goes to Step 210;

In Embodiment 2, that the mobile device successively uses the identity parsed keys of the Bluetooth device saved by the mobile device to authenticate the first dynamic address, and determines whether there exists the first identity parsed key authenticated successfully specifically includes Step m1, the mobile device reads the first identity parsed key in the identity parsed keys list saved by the mobile device and makes the first identity parsed key as a current identity parsed key;

Step m2, the mobile device uses the current identity parsed key to authenticate the first dynamic address, determines whether the first dynamic address is authenticated successfully, if yes, determines that there exists the first identity parsed key authenticated successfully, goes to Step 209; otherwise, goes to Step m3;

Step m3, the mobile device determines whether the current identity parsed key is the last one in the identity parsed keys list saved by the mobile device, if yes, determines that there exists no the first identity parsed key authenticated successfully, goes to Step 210; otherwise, makes a next identity parsed key to the current identity parsed key as the current identity parsed key, returns to Step m2;

In which, Step m2 specifically includes

Step m2-1, the mobile device parses the first dynamic address to obtain the first random number and the first data;

Specifically, the mobile device reads the high 24 bits of the first dynamic address to obtain the first random number, reads the low 24 bits of the first dynamic address to obtain the first data;

for instance, in Embodiment 2, the first dynamic address is parsed to obtain the first random number, which is 423456, and the first data which is 766B05.

Step m2-2, the mobile device generates the fourth data according to the current identity parsed key and the first random number, determines whether the fourth data is the same as the first data, if yes, determines that there exists the first identity parsed key authenticated successfully, goes to Step 209; otherwise, goes to Step m3;

in Embodiment 2, the method for generating the fourth data by the mobile device according to the current identity parsed key and the first random number is the same as the method for generating the first data by the target Bluetooth device according to the first random number and the first identity parsed key of itself, more details about the method will not be given therein.

Step 209, the mobile device sends the link encrypted request to the target Bluetooth device;

Step 210, the mobile device generates a matching request including the second identity parsed key of the mobile device, and sends the matching request to the target Bluetooth device;

for instance, in Embodiment 2, the second identity parsed key of the mobile device is 112233445566778899AABBCCDDEEFF00.

Step 211, the target Bluetooth device receives a request sent from the mobile device, determines a type of the request, goes to Step 212 in the case that the request is the matching request; goes to Step 214 in the case that the request is the link encrypted request;

Step 211 further includes the target Bluetooth device determines whether data sent from the mobile device is received in the second preset duration, if yes, goes to Step 212 in the case that the request is the matching request, and goes to Step 214 in the case that the request is the link encrypted request; otherwise, the target Bluetooth device closes down, the method comes to an end.

Preferably, in Embodiment 2, the second preset duration is 35 seconds.

Step 212, the target Bluetooth device matches with the connected mobile device, parses the received matching request to obtain the second identity parsed key of the connected mobile device, saves the second identity parsed key, generates a matching response including the first identity parsed key of itself, returns the matching response to the connected mobile device;

for instance, in Embodiment 2, the second identity parsed key of the mobile device obtained by parsing the received matching request by the target Bluetooth device is 112233445566778899AAB BCCDDEEFF00.

Furthermore, in Embodiment 2, before the target Bluetooth device saves the second identity parsed key, the method includes Step H, the target Bluetooth device determines whether the identity parsed key of the mobile device saved by itself includes the second identity parsed key, if yes, generates the matching response including the first identity parsed key of itself, returns the matching response to the mobile device; otherwise, continues to save the second identity parsed key; or Step F, the target Bluetooth device determines whether the identity parsed key of the mobile device saved by itself includes the second identity parsed key, if yes, deletes the saved second identity parsed key, continues to save the second identity parsed key; otherwise, continues to save the second identity parsed key.

Step 213, the mobile device parses the received matching response to obtain the first identity parsed key, saves the first identity parsed key, returns to Step 209;

Step 214, the target Bluetooth device determines whether an identity parsed key of the mobile device is saved in the target Bluetooth device, if yes, goes to Step 215; otherwise, returns error code to the mobile device, disconnects the connection with the mobile device, and the method comes to an end;

Specifically, the target Bluetooth device determines whether the identity parsed keys list saved in itself is null, if yes, determines that no identity parsed key of the mobile device is saved by the target Bluetooth, returns error code to the connected mobile device, disconnects the connection with the mobile device, and the method comes to an end; otherwise, determines that the target Bluetooth device saves the identity parsed key of the mobile device, goes to Step 215;

Step 215, the target Bluetooth device successively uses the identity parse keys of the mobile device saved by the target Bluetooth device to authenticate the second dynamic address, determines whether there exists the second identity parsed key which is successfully authenticated, if yes, saves the dialogue key information according to the received link encrypted request, returns the success response to the connected mobile device, and goes to Step 217; otherwise, returns error code to the connected mobile device;

In Embodiment 2, that the target Bluetooth device successively uses the identity parsed keys of the mobile device saved by itself to authenticate the second dynamic address, and determines whether there exists the second identity parsed key which is authenticated successfully specifically comprises Step n1, the target Bluetooth device reads the first identity parsed key in the identity parsed keys list saved by the target Bluetooth device and makes the first identity parsed key as the current identity parsed key;

Step n2, the target Bluetooth device uses the current identity parsed key to authenticate the second dynamic address, determines that there exists the second identity parsed key which is authenticated successfully if the second dynamic address is authenticated successfully, goes to Step 217; goes to Step n3 if the second dynamic address is authenticated unsuccessfully;

Step n3, the target Bluetooth device determines whether the current identity parsed key is the last one in the identity parsed keys list saved by itself, if yes, determines that there does not exist the second identity parsed key which is authenticated successfully, returns error code to the mobile device, disconnects the connection with the mobile device, the method comes to an end; otherwise, makes the next identity parsed key to the current identity parsed key as the current identity parsed key, returns to Step n2, in which, Step n2 specifically includes Step n2-1, the target Bluetooth device parses the second dynamic address to obtain the second random number and the second data;

Specifically, the target Bluetooth device reads the high 24 bits of the second dynamic address to obtain the second random number, reads the low 24 bits of the dynamic address to obtain the second data;

for instance, in Embodiment 2, the second dynamic address is parsed to obtain the second random number which is 683D97 and to obtain the second data which is 52CB5E.

Step n2-2, the target Bluetooth device generates the third data according to the current identity parsed key and the second random number, determines whether the third data is the same as the first data, if yes, determines that the second dynamic address is authenticated successfully, there exists the second identity parsed key which is authenticated successfully; otherwise, determines that the second dynamic address is authenticated unsuccessfully, goes to Step n3;

In Embodiment 2, the method for generating the third data according to the current identity key and the second random number by the target Bluetooth device is the same as the method for generating the first data by the target Bluetooth device according to the first random number and the first identity parsed key of itself, no more details will be given herein.

In Embodiment 2, when the response returned from the mobile device and received by the target Bluetooth device is error code, the method further includes the mobile device prompts an incorrect user information via an applet, receives widget triggered information from the user, returns to Step 210 in the case that the widget triggered information is re-matching information; disconnects the connection in the case that the widget triggered information is ending information, the method comes to an end.

Correspondingly, after the target Bluetooth device returns error code to the connected mobile device, Step 214 further comprises returning to Step 212 in the case that the matching request sent from the connected mobile device is received in the second preset duration.

Step 216, the mobile device disconnects the connection with the target Bluetooth device, the method comes to an end;

Step 217, the target Bluetooth device communicates with the mobile device;

Step 218, the mobile device communicates with the target Bluetooth device, the method comes to an end;

It needs to be noted that the communication in Step 217 and Step 218 specifically means that the target Bluetooth device executes an API functional communication with the mobile device.

Embodiment 3

Figure 3:
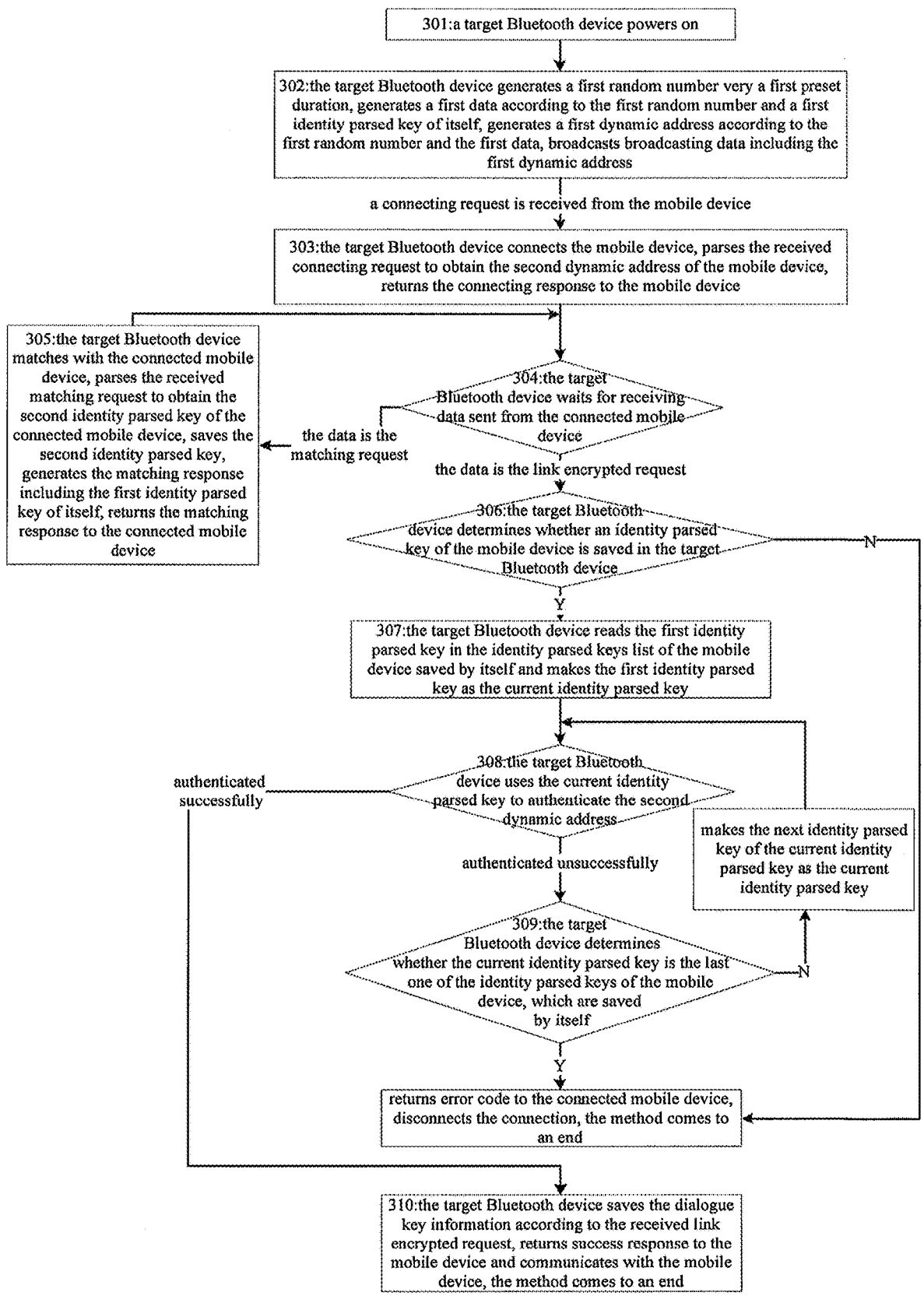
FIG. 3 shows a flow diagram of a Bluetooth device working method for avoiding a Bluetooth from being tracing according to the Embodiment 3 of the present invention.

It provides a working method for avoiding a Bluetooth device from being traced according to Embodiment 3 of the present invention, as shown in FIG. 3, including:

Step 301, a target Bluetooth device powers on;

Step 302, the target Bluetooth device generates a first random number every a first preset duration, generates a first data according to the first random number and a first identity parsed key of itself, generates a first dynamic address according to the first random number and the first data, broadcasts broadcasting data including the first dynamic address, and goes to Step 303 when a connecting request is received from the mobile device;

Preferably, in Embodiment 3, the first preset duration is 60 s;

In Embodiment 3, the target Bluetooth device generating the first random number, generating the first data according to the first random number and the first identity parsed key of itself, and generating the first dynamic address according to the first random number and the first data specifically includes Step a1, the target Bluetooth device generates the first random number, and adds bits to the first random number;

Specifically, the target Bluetooth device generates the first random number of 24 bits, and the two highest bits of the first random number is 01, and adds 0 to the first preset bit on the left of the first random number;

Preferably, in Embodiment 3, the first preset bit is 104 bits;

For instance, in Embodiment 3, the first random number generated by the target Bluetooth device is 423456, the first random number which is added bits by the target Bluetooth device is 00000000000000000000000000423456.

Step a2, the target Bluetooth device uses the first identity parsed key of itself to encrypt the first random number which is added bits to obtain a first random number ciphertext;

Specifically, the target Bluetooth device uses the first identity parsed key of itself to execute AES encryption on the first random number which is added bits to obtain the first random number ciphertext;

For instance, in Embodiment 3, the first identity parsed key of the target Bluetooth device is 0102030405060708090A0B0C0D0E0F10, the first random number ciphertext obtained is 9912D4 DD9EE19546190599551D766B05.

Step a3, the target Bluetooth device executes a preset operation on the first random number ciphertext to obtain the first data;

Specifically, the target Bluetooth device uses the first random number ciphertext to execute modulo operation on 2^24 to obtain an operation result, makes the operation result as the first data;

For instance, in Embodiment 3, the obtained operation result by using the first random number ciphertext to execute modulo operation on 2^24 by the target Bluetooth device is 766B05, the first data is 766B05.

Step a4, the target Bluetooth device joins the first random number with the first data to obtain the first dynamic address;

for instance, in Embodiment 3, the first dynamic address obtained by joining the first random number with the first data by the target Bluetooth device is 423456766B05.

Step 303, the target Bluetooth device connects the mobile device, parses the received connecting request to obtain the second dynamic address of the mobile device, returns the connecting response to the mobile device;

In Embodiment 3, before the target Bluetooth device parses the received connecting request to obtain the second dynamic address of the mobile device, the method further includes Step B1, the target Bluetooth device determines whether the address included in the received connecting request is a dynamic address, if yes, makes the address as the second dynamic address of the mobile device, continues to parse the received connecting request to obtain the second dynamic address; otherwise, returns the connecting response to the mobile device, goes to Step B2;

Specifically, the target Bluetooth device determines whether data on the second preset bit of the address included in the received connecting request is the preset data, if yes, determines that the address included in the received connecting request is the dynamic address; otherwise, determines that the address included in the connecting request is not the dynamic address;

In Embodiment 3, the second preset bit is the highest two bits, the preset data is 01.

For instance, in Embodiment 3, the address included in the connecting request is 683D9752CB5E, thus the address is the dynamic address.

Step B2, the target Bluetooth device waits for receiving data sent from the mobile device, goes to Step B3 in the case that the data is the link encrypted request; matches with the mobile device, saves the matching information, and generates the matching response including the first identity parsed key of itself, returns the matching response to the mobile device, and goes to Step B2 in the case that the data is the matching request;

Step B3, the target Bluetooth device determines whether the matching information saved by itself includes the matching information which is about the mobile device, if yes, saves the dialogue key information according to the link encrypted request, returns the success response to the mobile device and communicates with the mobile device, the method comes to an end; otherwise, returns error code to the mobile device, the method comes to an end.

Specifically, the target Bluetooth device determines whether the matching information saved by itself includes the address included in the received connecting request, if yes, determines that the matching information saved by itself includes the matching information which is about the mobile device; otherwise, determines that the matching information saved by itself does not include the matching information which is about the mobile device.

Step 304, the target Bluetooth device waits for receiving data sent from the connected mobile device, goes to Step 305 in the case that the data is the matching request; goes to Step 306 in the case that the data is the link encrypted request;

Step 304 further includes that the target Bluetooth device determines whether the data sent from the mobile device is received in the second preset duration, if yes, goes to Step 305 in the case that the data is the matching request, goes to Step 306 in the case that the data is the link encrypted request; otherwise, the target Bluetooth turns off, the method comes to an end.

Preferably, in Embodiment 3, the second preset time is 35 seconds.

Step 305, the target Bluetooth device matches with the connected mobile device, parses the received matching request to obtain the second identity parsed key of the connected mobile device, saves the second identity parsed key, generates the matching response including the first identity parsed key of itself, returns the matching response to the connected mobile device, and returns to Step 304;

For instance, in Embodiment 3, the target Bluetooth device parses the received matching request to obtain the second identity parsed key of the connected mobile device, which is 112233445566778899AABBCCDDEEFF00.

Furthermore, in Embodiment 3, before the target Bluetooth device saves the second identity parsed key, the method further includes Step H, the target Bluetooth device determines whether the identity parsed key saved by itself includes the second identity parsed key, if yes, generates a matching response including the first identity parsed key of itself, returns the matching response to the connected mobile device, returns to Step 304; otherwise, continues to save the second identity parsed key; or Step F, the target Bluetooth device determines whether the identity parsed key saved by itself includes the second identity parsed key, if yes, deletes the saved second identity parsed key, continues to save the second identity parsed key; otherwise, continues to save the second identity parsed key.

Step 306, the target Bluetooth device determines whether an identity parsed key of the mobile device is saved in the target Bluetooth device, if yes, goes to Step 307; otherwise, returns error code to the connected mobile device, disconnects the connection, the method comes to an end;

Specifically, the target Bluetooth device determines whether the identity parsed keys list saved by itself is null, if yes, determines that no identity parsed key of the mobile device is saved by the target Bluetooth device, returns error code to the connected mobile device, disconnects the connection, the method comes to an end; otherwise, determines that there is the identity parsed key of the mobile device saved by itself, goes to Step 307.

Step 307, the target Bluetooth device reads the first identity parsed key of the identity parsed keys of the mobile device saved by itself and makes the first identity parsed key as the current identity parsed key;

Specifically, the target Bluetooth device reads the first identity parsed key in the identity parsed keys list saved by itself and make the first identity parsed key as the current identity parsed key.

Step 308, the target Bluetooth device uses the current identity parsed key to authenticate the second dynamic address, goes to Step 310 in the case that the second dynamic address is authenticated successfully; goes to Step 309 in the case that the second dynamic address is authenticated unsuccessfully;

In Embodiment 3, the method for authenticating the first dynamic address by using the current identity parsed key by the target Bluetooth device is the same as the method for authenticating the second dynamic address by using the current identity parsed key by the target Bluetooth device in Step n2 in Embodiment 2, no more details will be given herein.

Step 309, the target Bluetooth device determines whether the current identity parsed key is the last one of the identity parsed keys of the mobile device, which are saved by itself, if yes, returns error code to the connected mobile device, disconnects the connection, the method comes to an end;

otherwise, makes the next identity parsed key to the current identity parsed key as the current identity parsed key, returns to Step 308.

Furthermore, in Embodiment 3, after the target Bluetooth device returns error code to the connected mobile device, the method further includes returning to Step 305 when the matching request sent by the connected mobile device is received in the second preset duration.

Step 310, the target Bluetooth device saves the dialogue key information according to the received link encrypted request, returns success response to the mobile device and communicates with the mobile device, the method comes to an end.

In Embodiment 3, Step 310 specifically comprises

Step t1, the target Bluetooth device parses the received link encrypted request to obtain the dialogue key identification, and determines whether the dialogue keys list saved by itself includes the obtained dialogue key identification, if yes, returns success response to the connected mobile device and communicates with the mobile device, the method comes to an end; otherwise, goes to Step t2;

Step t2, the target Bluetooth device consults with the mobile device to obtain a dialogue key, saves the obtained dialogue key with the obtained dialogue key identification correspondingly into the dialogue keys list, returns success response to the connected mobile device and communicates with the mobile device, the method comes to an end.

It needs to be noted that the communication with the mobile device in this step is specifically executing API functional communication with the mobile device.

Embodiment 4

Figure 4:
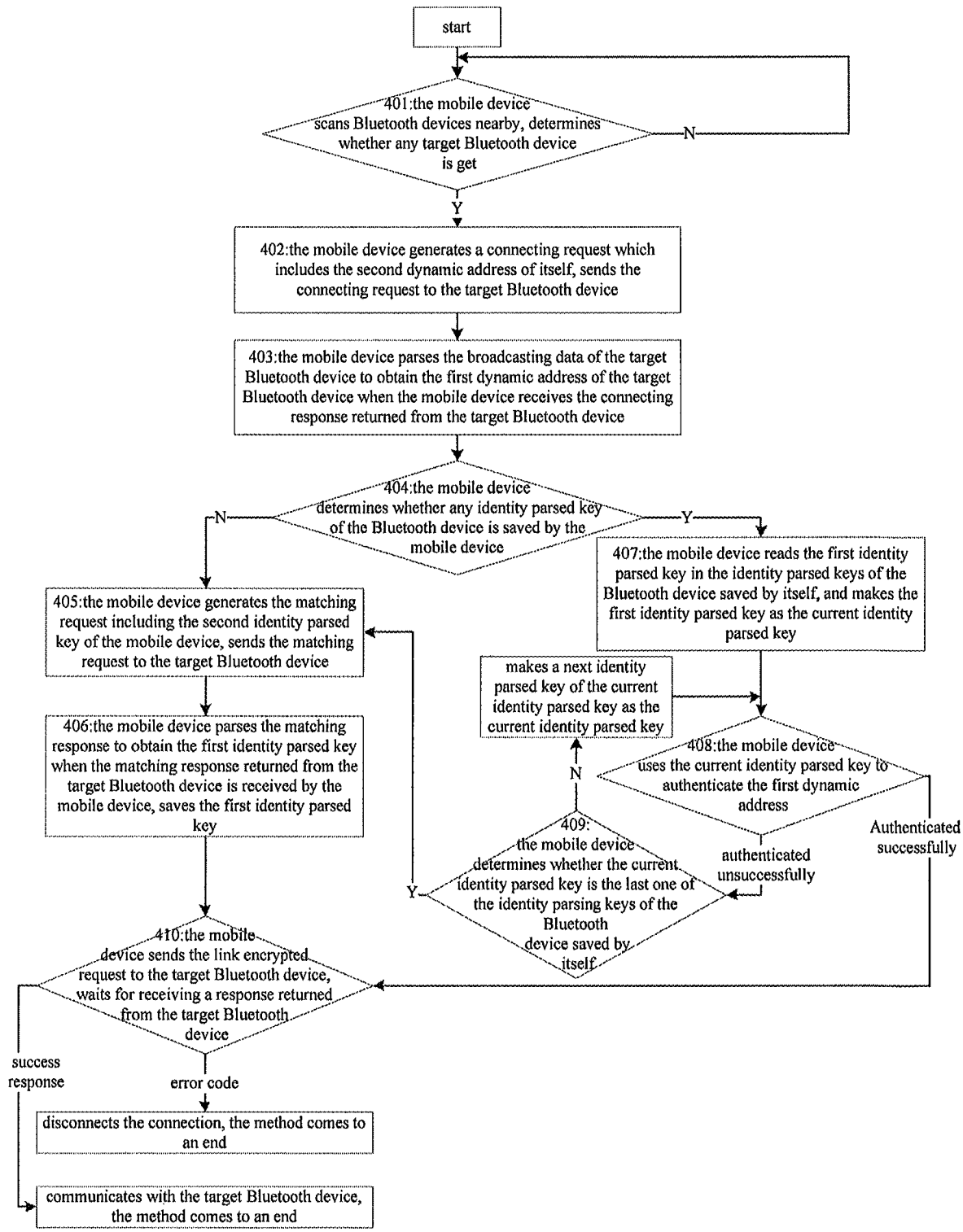
FIG. 4 shows a flow diagram of a Bluetooth device working method for avoiding a Bluetooth from being tracing according to the Embodiment 4 of the present invention.

It provides a working method of a mobile device in a method for avoiding a Bluetooth from being tracing, as shown in FIG. 4, comprises Step 401, the mobile device scans Bluetooth devices nearby, determines whether any target Bluetooth device is get, if yes, goes to Step 402; otherwise, continues to execute Step 401;

Specifically, a first device scans the Bluetooth devices nearby, and obtains broadcasting data of the Bluetooth device which is get by the first device, parses the obtained broadcasting data to obtain a device name of the Bluetooth device, determines whether the obtained device name of the Bluetooth device is the same as the device name of the target Bluetooth device, if yes, the target Bluetooth device is obtained; otherwise, no Bluetooth device is obtained.

Furthermore, in Embodiment 4, before Step 401, the method further includes that the mobile device generates the second dynamic address of the mobile device;

In Embodiment 4, the process of generating the second dynamic address of the mobile device by the mobile device is the same as the process of generating the first dynamic address by the Bluetooth device, no more details will be given herein.

For instance, the second dynamic address of itself generated by the mobile device is 683D9752CB5E.

Step 402, the mobile device generates a connecting request which includes the second dynamic address of itself, sends the connecting request to the target Bluetooth device;

in Embodiment 4, before Step 402, the method further includes the mobile device generates the second dynamic address of itself every the third preset duration, in which, the process of the mobile device generating the second dynamic address of itself is the same as the process of the target Bluetooth device generating the first dynamic address of itself in Embodiment 3, no more details will be given herein.

Step 403, the mobile device parses the broadcasting data of the target Bluetooth device to obtain the first dynamic address of the target Bluetooth device when the mobile device receives the connecting response returned from the target Bluetooth device;

In Embodiment 4, before parsing the broadcasting data of the target Bluetooth device to obtain the first dynamic address of the target Bluetooth device, the method further comprises Step D1, the mobile device determines whether the address included in the broadcasting data of the target Bluetooth device is a dynamic address, if yes, makes the address included in the broadcasting data of the target Bluetooth device as the first dynamic address of the target Bluetooth device, continues to parse the broadcasting data of the target Bluetooth device to obtain the first dynamic address of the target Bluetooth device; otherwise, goes to Step D2;

Specifically, the mobile device determines whether data on the second preset bit of the address included in the broadcasting data of the target Bluetooth device is preset data, if yes, determines that the address included in the broadcasting data of the target Bluetooth device is the dynamic address; otherwise, determines that the address included in the broadcasting data of the target Bluetooth device is not the dynamic address;

In Embodiment 4, the preset bit is the highest two bits, thus, the preset data is 01.

For instance, in Embodiment 4, the address included in the broadcasting data of the target Bluetooth device is 423456766B05, thus, the address is the dynamic address.

Step D2, the mobile device determines whether the matching information saved by itself includes matching information which is about the target Bluetooth device, if yes, goes to Step D3; otherwise, goes to Step D4;

Specifically, the mobile device determines whether the matching information saved by itself includes the address included in the broadcasting data, if yes, determines that the matching information saved by itself includes the matching information which is about the target Bluetooth device; otherwise, determines that the matching information saved by itself does not include the matching information which is about target Bluetooth device.

Step D3, the mobile device sends a link encrypted request to the target Bluetooth device, and communicates with the target Bluetooth device when a success response returned from the target Bluetooth device is received, the method comes to an end; disconnects the connection when error code is received, the method comes to an end;

Step D4, the mobile device generates a matching request including the second identity parsed key of itself, sends the matching request to the target Bluetooth device, and saves the matching information when a matching response returned from the target Bluetooth device is received, returns to Step D3.

Step 404, the mobile device determines whether any identity parsed key of the Bluetooth device is saved by the mobile device, if yes, goes to Step 407; otherwise, goes to Step 405;

Specifically, the mobile device determines whether the identity parsed keys list saved by itself is null, if yes, determines that no identity parsed key of the Bluetooth device is saved by itself, goes to Step 405; otherwise, determines that there exists identity parsed key of the Bluetooth device which is saved by the mobile device, goes to Step 407.

Step 405, the mobile device generates the matching request including the second identity parsed key of the mobile device, sends the matching request to the target Bluetooth device;

For instance, in Embodiment 4, the second identity parsed key of the mobile device is 112233445566778899AABBCCDDEEFF00.

Step 406, the mobile device parses the matching response to obtain the first identity parsed key of the target Bluetooth device when the matching response returned from the target Bluetooth device is received by the mobile device, saves the first identity parsed key, and goes to Step 410;

For instance, in Embodiment 4, the first identity parsed key of the target Bluetooth device obtained by parsing, by the mobile device, the matching response returned from the target Bluetooth device is 0102030405060708090A0B0C0D0E0F10.

Step 407, the mobile device reads the first identity parsed key in the identity parsed keys of the Bluetooth device saved by itself, and makes the first identity parsed key as the current identity parsed key;

Specifically, the mobile device reads the first identity parsed key in the identity parsed keys list saved by itself, and makes the first identity parsed key as the current identity parsed key.

Step 408, the mobile device uses the current identity parsed key to authenticate the first dynamic address, goes to Step 410 in the case that the first dynamic address is authenticated successfully; goes to Step 409 in the case that the first dynamic address is authenticated unsuccessfully;

In Embodiment 4, the method for using the current identity parsed key, by the mobile device, to authenticate the first dynamic address is the same as the method for using the current identity parsed key, by the mobile device, to authenticate the first dynamic address in Step m2 in Embodiment 2, details will not be repeated herein.

Step 409, the mobile device determines whether the current identity parsed key is the last one of the identity parsed keys of the Bluetooth device saved by itself, if yes, returns to Step 405; otherwise, makes a next identity parsed key of the current identity parsed key as the current identity parsed key, returns to Step 408.

Step 410, the mobile device sends the link encrypted request to the target Bluetooth device, waits for receiving a response returned from the target Bluetooth device, communicates with the target Bluetooth device in the case that the response is the success response, the method comes to an end; disconnects the connection in the case that the response is error code, the method comes to an end.

It needs to be noted that the communication with the target Bluetooth device in the said step specifically means API functional communication with the target Bluetooth device.

Furthermore, in Embodiment 4, when the response returned from the target Bluetooth received by the mobile device is error code, the method further includes the mobile device prompts user error information via applet, receives a widget triggering information from a user, returns to Step 405 in the case that widget triggering information is a re-matching information; disconnects the connection in the case that the widget triggering information is ending information, the method comes to an end.

Embodiment 5

Figure 5:
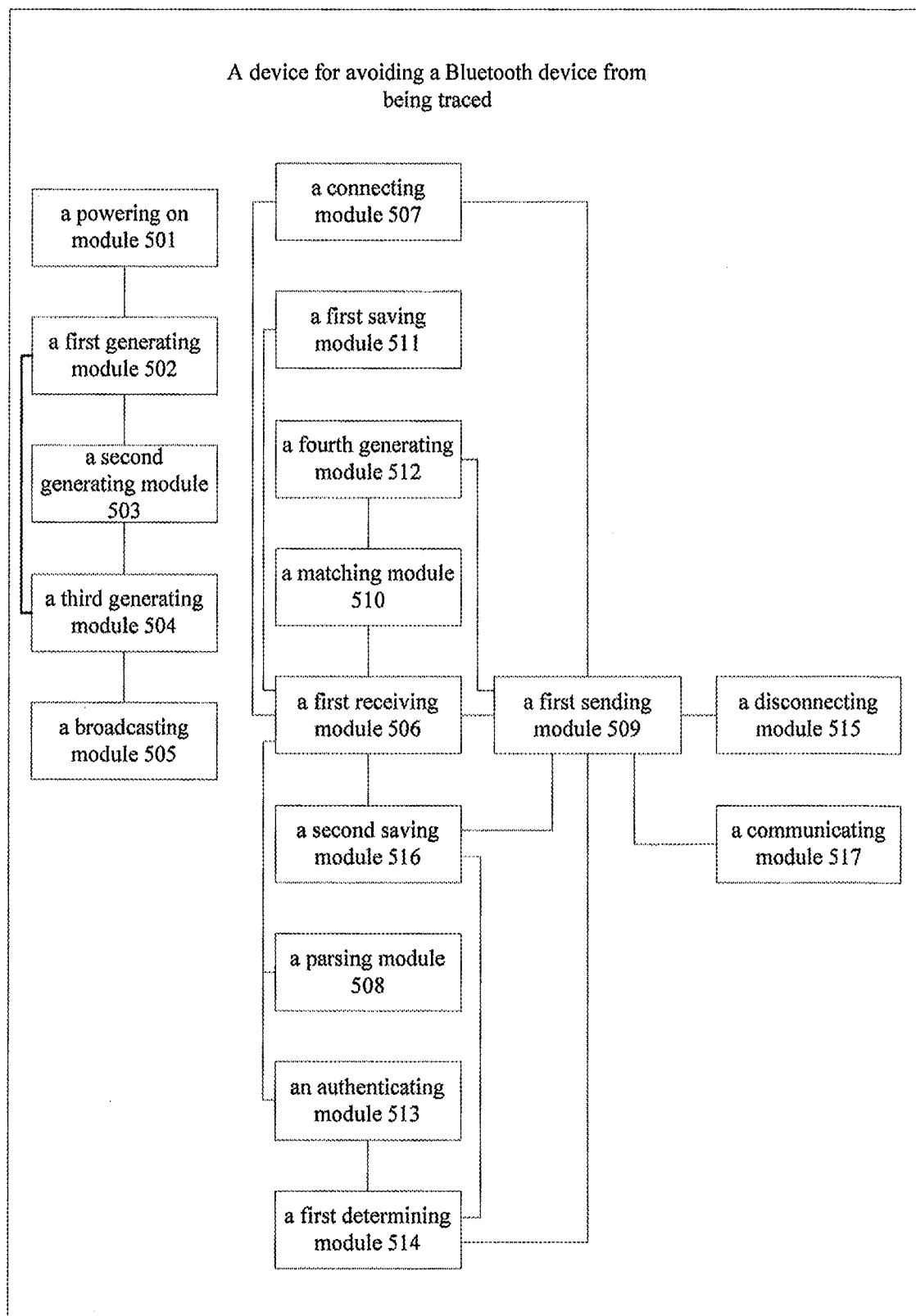
FIG. 5 shows a block diagram of modules in a device for avoiding a Bluetooth from being tracing according to Embodiment 5 of the present invention.

It provides a device which can avoid the Bluetooth from being traced according to Embodiment 5, as shown in FIG. 5, comprises a powering on module 501 which is configured to power on;

a first generating module 502 which is configured to generate a first random number every first preset duration after the powering on module 501 powers on;

a second generating module 503 which is configured to generate a first data according to the first random number generated by the first generating module 502 and the first identity parsed key of the device;

a third generating module 504 which is configured to generate a first dynamic address according to the first random number generated by the first generating module 502 and the first data generated by the second generating module 503;

a broadcasting module 505 which is configured to broadcast broadcasting data including the first dynamic address;

a first receiving module 506 which is configured to receive data sent from the mobile device;

a connecting module 507 which is configured to connect to the mobile device when a connecting request sent from the mobile device is received by the first receiving module 506;

a parsing module 508 which is configured to parse the connecting request received by the first receiving module 506 to obtain a second dynamic address of the mobile device;

a first sending module 509 which is configured to return a connecting response to the mobile device;

the first receiving module 506 is further configured to wait for receiving data sent from the mobile device after the first sending module 509 returns the connecting response to the mobile device;

a matching module 510 which is configured to match with the mobile device when the first receiving module 506 receives the matching request sent from the mobile device;

a first saving module 511 which is configured to save the second identity parsed key included in the matching request which is received by the first receiving module 506 into the identity parsed keys list;

a fourth generating module 512 which is configured to generate a matching response including the first identity parsed key of the device;

the first sending module 509 is further configured to return the matching response generated by the fourth generating module 512 to the mobile device;

the first receiving module 506 is further configured to wait for receiving data sent from the mobile device after the first sending module 509 returns the matching response to the mobile device;

an authenticating module 513 which is configured to uses successively one identity parsed key in the identity parsed keys list saved by itself to authenticate the second dynamic address obtained by the parsing module 508 when the first receiving module 506 receives the link encrypted request sent from the mobile device;

a first determining module 514 which is configured to determine whether there exists any second identity parsed key which is authenticated successfully;

the first sending module 509 is further configured to return error code to the connected mobile device when the first determining module 514 determines that there is no second identity parsed key which is authenticated successfully;

a disconnecting module 515 which is configured to disconnects the connection after the first sending module 509 returns error code to the connected mobile device;

a second saving module 516 which is configured to save the dialogue key information according to the link encrypted request received by the first receiving module 506 when the first determining module 514 determines there is the second identity parsed key which is authenticated successfully;

the first sending module 509 is further configured to returns a success response to the connected mobile device after the second saving module 516 saves the dialogue key information;

a communicating module 517 which is configured to communicate with the connected mobile device after the first sending module 509 returns the success response to the connected mobile device.

In Embodiment 5, the first generating module 502 is specifically configured to generate the first random number, and to add bits to the first random number;

the second generating module 503 is specifically configured to use the first identity parsed key of the mobile device to encrypt the first random number which is added bits to obtain a first random number ciphertext, to execute a preset operation on the first random number ciphertext to obtain the first data;

the third generating module 504 is specifically configured to join orderly the first random number generated by the first generating module 502 with the first data generated by the second generating module 503 to obtain the first dynamic address.

The device in the Embodiment 5 further comprises a second determining module, a as module, a second sending module, a second receiving module, a match-saving module, a third determining module and a third saving module, in which, the second determining module is configured to determine whether the address included in the connecting request is a dynamic address;

the as module is configured to make the address included in the connecting request as the second dynamic address of the mobile device when the second determining module determines that the address included in the connecting request is a dynamic address, and to trigger the parsing module 508;

the second sending module is configured to return the connecting response to the mobile device when the second determining module determines that the address included in the connecting request is not a dynamic address;

the second receiving module is configured to wait for receiving data sent from the mobile device after the second sending module returns the connecting response to the mobile device;

the match-saving module is configured to match with the mobile device, save the matching information when the second receiving module receives the matching request;

the second sending module is configured to generate the matching response including the first identity parsed key of the device and return the matching response to the mobile device after the match-saving module saves the matching information;

the second receiving module is configured to wait for receiving data sent from the mobile device after the second sending module returns the matching response to the mobile device;

the third determining module is configured to determine whether the saved matching information includes the matching information about the mobile device when the second receiving module receives the link encrypted request;

the third saving module is further configured to save the dialogue key information according to the link encrypted request when the third determining module determines that the saved matching information includes the matching information which is about the mobile device the second sending module is further configured to return the success response to the mobile device after the third saving module saves the dialogue key information;

the communicating module 517 is further configured to communicate with the mobile device after the second sending module returns the success response to the mobile device;

the second sending module is further configured to return error code to the mobile device when the third determining module determines that the saved matching information does not include the matching information which is about the mobile device;

the disconnecting module 515 is further configured to disconnect the connection after the second sending module returns error code to the mobile device, in which, the second determining module is specifically configured to determine whether data on the second preset bit of the address included in the connecting request is the preset data, if yes, determines that the address included in the connecting request is a dynamic address; otherwise, determines that the address included in the connecting request is not a dynamic address.

The third determining module is specifically configured to determine whether the matching information saved by the device includes the address included in the received connecting request, if yes, determines that the matching information saved by the device includes the matching information which is about mobile device; otherwise, determines that the matching information saved by the device does not include the matching information which is about the mobile device.

The device in Embodiment 5 further includes a fourth determining module and a close off module; in which, the fourth determining module is configured to determine whether data sent from the mobile device is received by the first receiving module 506 in the second preset duration;

the close off module is configured to close off when the fourth determining module determines that the data sent from the mobile device is not received by the first receiving module 506 in the second preset duration.

The device in Embodiment 5 further includes a fifth determining module, or a sixth determining module and a deleting module;

in which, the fifth determining module is configured to determine whether the identity parsed keys list saved by the device includes the second identity parsed key included in the matching request;

the fourth generating module 512 is further configured to generate a matching response including the first identity parsed key of the device when the fifth determining module determines that the identity parsed keys list saved by the device includes the second identity parsed key included in the matching request;

the first saving module 511 is further configured to save the second identity parsed key included in the matching request into the identity parsed keys list when the fifth determining module determines that the identity parsed keys list saved by the device does not include the second identity parsed key included in the matching request;

the sixth determining module is configured to determine whether the identity parsed keys list saved by the device includes the second identity parsed key included in the matching request;

the deleting module is configured to delete the second identity parsed key included in the identity parsed keys list when the sixth determining module determines that the identity parsed keys list saved by the device includes the second identity parsed key included in the matching request;

correspondingly, the first saving module 511 is further configured to save the second identity parsed key included in the matching request into the identity parsed keys list after the deleting module deletes the second identity parsed key included in the identity parsed keys list; is further configured to save the second identity parsed key included in the matching request into the identity parsed keys list when the sixth determining module determines that the identity parsed keys list saved by the device does not include the second identity parsed key included in the matching request.

The device in Embodiment 5 further includes a seventh determining module;

the seventh determining module is configured to determine whether the identity parsed keys list saved by the device is null;

correspondingly, the first sending module 509 is further configured to return an error code to the connected mobile device when the seventh determining module determine that the identity parsed keys list saved by the device is null;

the authenticating module 513 is specifically configured to use successively the identity parsed keys in the identity parsed keys list saved by the device to authenticate the second dynamic address obtained by the authenticating module 508 when the seventh determining module determine that the identity parsed keys list saved by the device is not null.

Furthermore, in Embodiment 5, the authenticating module 513 includes a first parsing sub module and a generating sub module, in which, the first parsing sub module is configured to parse the second dynamic address to obtain the second random number and the second data;

the generating sub module is configured to generate multiple of third data according orderly to the identity parsed keys in the identity parsed keys list saved by the device and the second random number;

correspondingly, the first determining module 514 is specifically configured to determine whether there exists the third data which is the same as the second data obtained by the first parsing sub module, if yes, determines that there exists the second identity parsed key which is authenticated successfully; otherwise, determines that there does not exist the second identity parsed key which is authenticated successfully.

In Embodiment 5, the first parsing sub module is specifically configured to read a high preset bit of the second dynamic address to obtain the second random number, and to read a low preset bit of the second dynamic address to obtain the second data.

In Embodiment 5, the generating module comprises an adding bit unit, an encrypting unit and an operating unit, in which, the adding bit unit is configured to add bits to the second random number obtained by the parsing sub module;

the encrypting module is configured to successively use the identity parsed keys in the identity parsed keys list saved by the device to encrypt the second random number which is added bits by the adding bit unit to obtain multiple of second random number ciphertext;

the operating unit is configured to execute preset operation on multiple of second random number ciphertext obtained by the encrypting unit to obtain multiple of third data.

In Embodiment 5, the second saving module 516 comprises a second parsing sub module, a determining sub module, a consulting sub module and a saving sub module, in which, the second parsing sub module is configured to parse the link encrypted request obtained by the first receiving module 506 to obtain the dialogue key identification;

the determining sub module is configured to determine whether the dialogue keys list saved by the device includes the dialogue key identification obtained by the second parsing sub module;

the first sending module 509 is further configured to return successful response to the connected mobile device when the determining sub module determines that the dialogue keys list saved by the device includes the dialogue key identification;

the consulting sub module is configured to consult with the mobile device to obtain a dialogue key when the determining sub module determines that the dialogue keys list saved by the device does not include the dialogue key identification obtained by the second parsing sub module;

the saving sub module is configured to save the dialogue key obtained by the consulting sub module with the dialogue key identification obtained by the second parsing sub module correspondingly into the dialogue keys list;

the first sending module 509 is further configured to return the success response to the connected mobile device after the saving sub module saves the dialogue key obtained by the consulting sub module with the dialogue key identification obtained by the second parsing sub module into the dialogue keys list.

In Embodiment 5, the matching module 510 is further configured to match with the connected mobile device when the first receiving module 506 receives the matching request sent from the connected mobile device in the second preset duration and after the first sending module 509 returns the error code to the connected mobile device.

In the method provided in the present invention, a Bluetooth device changes a dynamic address of itself periodically, and the Bluetooth device can just parse a dynamic address of a trustworthy device which has been matched with the Bluetooth device and the identity parsed keys have been changed with each other, and then they communicate with each other, in this way, in this way, data can be avoided from being stolen by a hacker effectively, and ensure the safety of the Bluetooth device and data used by the Bluetooth device user; at the same time, the Bluetooth device does not need to match with a credible device in the case that the process of matching with the credible device has finished, thus the time for building communication can be shorter, and it is more convenient for a user.

The above embodiments are preferable detailed description of embodiments, all of changes and substitutes by technicians in this field without innovative work belongs to scope of protection of the present invention. Any alteration or change easily obtained by those skilled in the art based on the application should fall in the scope of protection of the application.

The invention claimed is:

1. A method for avoiding a Bluetooth device from being traced, comprising the following steps:
- Step S1, powering on, by a target Bluetooth device, generating a first random number every a first preset duration, generating a first data according to the first random number and a first identity parsed key of the target Bluetooth device, generating a first dynamic address according to the first random number and the first data, broadcasting broadcast data which includes the first dynamic address, and executing Step S2 when a connecting request sent from a mobile device is received;
- Step S2, connecting, by the target Bluetooth device, to the mobile device, parsing the connecting request to obtain a second dynamic address of the mobile device, returning a connecting response to the mobile device;
- Step S3, waiting, by the target Bluetooth device, for receiving data sent from the mobile device, executing Step S4 in case that the data sent from the mobile device is a matching request; executing Step S5 in case that the data sent from the mobile device is a link encrypted request;
- Step S4, matching, by the target Bluetooth device, with the mobile device, saving a second identity parsed key included in the matching request into an identity parsed keys list, generating a matching response which includes the first identity parsed key of itself, returning the matching response to the mobile device, returning to Step S3;
- Step S5, using successively, by the target Bluetooth device, identity parsed keys in the identity parsed keys list saved by the target Bluetooth device to authenticate the second dynamic address, determining whether there exists any second identity parsed key which is authenticated successfully, if yes, executing Step S6; otherwise, returning an error code to the connected mobile device, disconnecting a connection, ending the method; and
- Step S6, saving, by the target Bluetooth device, dialogue key information according to the link encrypted request, returning a success response to the connected mobile device and communicating with the connected mobile device, ending the method, the target Bluetooth device successively using the identity parsed keys in the identity parsed keys list to authenticate the second dynamic address, and determining whether there exists any second identity parsed key which is authenticated successfully in Step S5 specifically comprises:
- Step b1, parsing, by the target Bluetooth device, the second dynamic address to obtain a second random number and a second data; and
- Step b2, generating, by the target Bluetooth device, a plurality of the third data successively according to the identity parsed keys in the identity parsed keys list saved by the target Bluetooth device and the second random number, and determining whether there exists the third data which is the same as the second data, if yes, determining that there exists the second identity parsed key which is authenticated successfully; otherwise, determining that there does not exist the second identity parsed key which is authenticated successfully.

2. The method as claimed in claim 1, wherein, before parsing the connecting request to obtain the second dynamic address of the mobile device, Step S2 further comprises:
- Step B1, determining, by the target Bluetooth device, whether an address included in the connecting request is a dynamic address, if yes, making the address as the second dynamic address of the mobile device, continuing to parse the connecting request to obtain the second dynamic address of the mobile device; otherwise, returning the connecting response to the mobile device, executing Step B2;
- Step B2, waiting, by the target Bluetooth device, for receiving data sent from the mobile device, executing Step B3 in case that the data is the link encrypted request; matching with the mobile device in case that the data is the matching request, and saving a matching information, and generating a matching response which includes the first identity parsed key of itself, returning the matching response to the mobile device, continuing Step S2; and
- Step B3, determining, by the target Bluetooth device, whether the matching information saved by itself includes matching information of the mobile device, if yes, saving the dialogue key information according to the link encrypted request, returning a success response to the mobile device and communicating with the mobile device, ending the method; otherwise, returning an error code to the mobile device, disconnecting a connection, ending the method.

3. The method as claimed in claim 1, wherein Step S3 further comprises determining whether the data sent from the mobile device is received in a second preset duration, if yes, continuing Step S3; otherwise, turning down the mobile device, ending the method.

4. The method as claimed in claim 1, wherein before saving the second identity parsed key included in the matching request into the identity parsed keys list, Step S4 further comprises:
- Step H, determining, by the target Bluetooth device, whether the identity parsed keys list saved by itself includes the second identity parsed key included in the matching request, if yes, generating the matching response which includes the first identity parsed key of itself, returning the matching response to the mobile device, and returning to Step S3; otherwise, continuing to save the second identity parsed key included in the matching request into the identity paring keys list; or
- Step F, determining, by the target Bluetooth device, whether the identity parsed keys list saved by the target Bluetooth device includes the second identity parsed key included in the matching request, if yes, deleting the second identity parsed key included in the identity parsed keys list, continuing to save the second identity parsed key included in the matching request into the identity parsed keys list; otherwise, continuing to save the second identity parsed key into the identity parsed keys list.

5. The method as claimed in claim 1, wherein before Step S5, the method further comprises
determining, by the target Bluetooth device, whether the identity parsed keys list saved by the target Bluetooth device is null, if yes, returning an error code to the connected mobile device, disconnecting the connection, ending the method; otherwise, executing Step S5.

6. The method as claimed in claim 1, wherein the target Bluetooth device generating a plurality of the third data successively according to the identity parsed keys in the identity parsed keys list saved by the target Bluetooth device and the second random number in Step b2 specifically comprises:
- Step d1, the target Bluetooth device adding bits to the second random number; and Step d2, the target Bluetooth device successively using the identity parsed keys in the identity parsed keys list saved by the target Bluetooth device to encrypt the second random number with added bits to obtain a plurality of a second random number ciphertext, and executing preset operation on the plurality of the second random number ciphertext to obtain the plurality of the third data.

7. The method as claimed in claim 1, wherein Step S6 further comprises:

Step t1, parsing, by the target Bluetooth device, the link encrypted request to obtain a dialogue key identification, determining whether a dialogue keys list saved by the target Bluetooth device includes the dialogue key identification, if yes, returning a success response to the connected mobile device and communicating with the connected mobile device, ending the method; otherwise, executing Step t2; and Step t2, consulting, by the target Bluetooth device, with the mobile device to obtain a dialogue key, saving the dialogue key with the dialogue key identification correspondingly into the dialogue keys list, returning a success response to the connected mobile device and communicating with the connected mobile device, ending the method.

8. The method as claimed in claim 1, comprising the following steps:

Step W1, sending, by the mobile device, the connecting request which includes the second dynamic address of the mobile device to the target Bluetooth device when the mobile device scans and finds the target Bluetooth device;

Step W2, parsing, by the mobile device, obtained broadcast data of the target Bluetooth device to obtain the first dynamic address when the mobile device receives the connecting response returned from the target Bluetooth device;

Step W3, determining, by the mobile device, whether itself saves the identity parsed key of the target Bluetooth device, if yes, executing Step W5; otherwise, executing Step W4;

Step W4, generating, by the mobile device, the matching request which includes the second identity parsed key of itself, sending the matching request to the target Bluetooth device, receiving the matching response returned from the target Bluetooth device, saving the first identity parsed key included in the matching response, and executing Step W6;

Step W5, successively using, by the mobile device, the identity parsed keys of the target Bluetooth device saved by the mobile device to authenticate the first dynamic address, and determining whether there exists the first identity parsed key which is authenticated successfully, if yes, executing Step W6; otherwise, returning to Step W4; and Step W6, sending, by the mobile device, the link encrypted request to the target Bluetooth device, receiving a response returned from the target Bluetooth device, communicating with the target Bluetooth device in case that the response is a success response, ending the method; disconnecting the connection in case that the response is an error code, ending the method.

9. The method as claimed in claim 8, wherein when the response received by the mobile device from the target Bluetooth device is the error code, Step W6 further comprises the mobile device prompting error information for a user via an applet, receiving widget triggering information from the user, returning to Step W4 in case that the widget triggering information is re-matching information; disconnecting the connection in case that the widget triggering information is ending information, ending the method; and after returning the error code to the connected mobile device, Step S5 further comprises returning to Step S4 when the matching request sent from the connected mobile device is received in the second preset duration.

* * * * *